Aug. 2, 1955
O. A. HOFFMAN
2,714,366
APPARATUS FOR APPLYING ADHESIVE TO BRAKE LINING SEGMENTS
Filed March 30, 1954
3 Sheets-Sheet 1
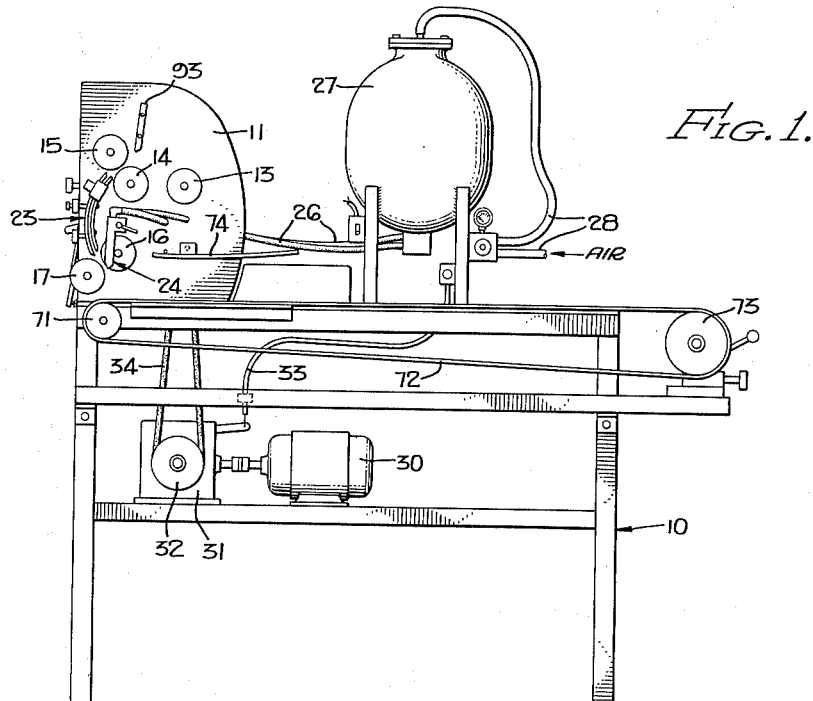
FIG. 1.
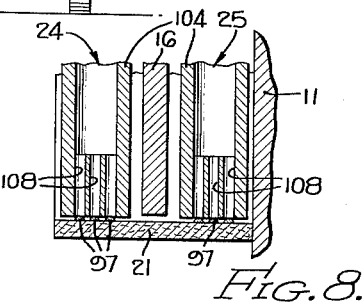
FIG. 8.
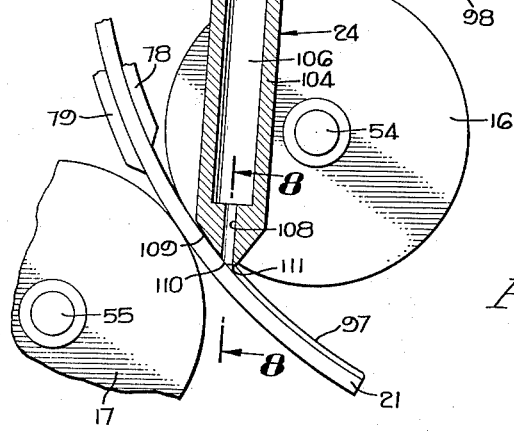
FIG. 6.
FIG. 7.
OSCAR A. HOFFMAN, INVENTOR.
BY 
ATTORNEY Aug. 2, 1955  O. A. HOFFMAN  2,714,366
APPARATUS FOR APPLYING ADHESIVE TO BRAKE LINING SEGMENTS
Filed March 30, 1954  3 Sheets-Sheet 2

OSCAR A. HOFFMAN,
INVENTOR.

BY
ATTORNEY

Aug. 2, 1955     O. A. HOFFMAN     2,714,366
APPARATUS FOR APPLYING ADHESIVE TO BRAKE LINING SEGMENTS
Filed March 30, 1954     3 Sheets-Sheet 3
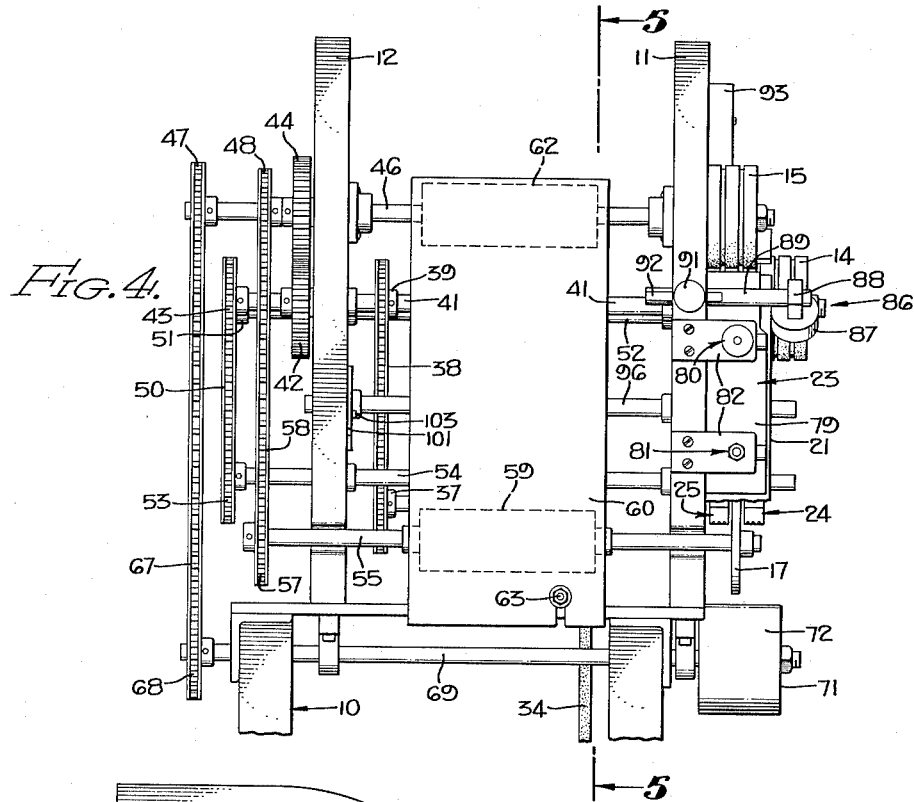
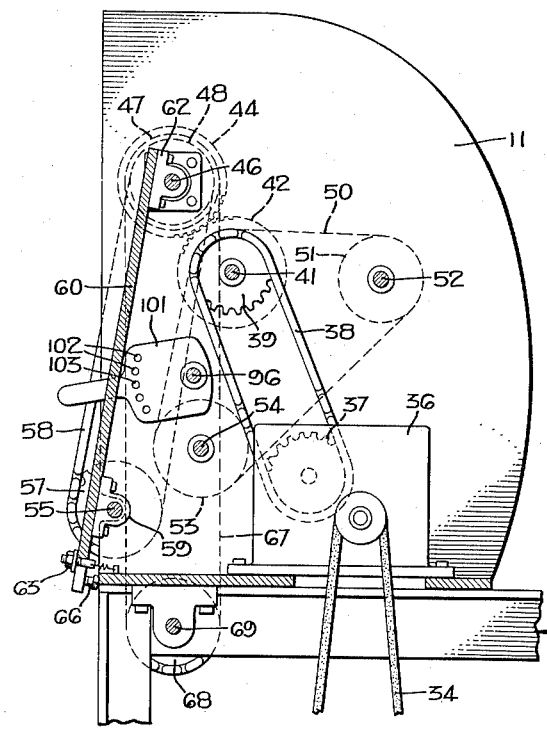
OSCAR A. HOFFMAN,
INVENTOR.
BY
ATTORNEY

United States Patent Office 2,714,366
Patented Aug. 2, 1955

2,714,366

APPARATUS FOR APPLYING ADHESIVE TO BRAKE LINING SEGMENTS

Oscar A. Hoffman, Altadena, Calif.

Application March 30, 1954, Serial No. 419,653

3 Claims. (Cl. 118—410)

This invention relates to an apparatus and method for applying adhesive to brake lining segments preparatory to bonding the segments to the brake shoes of automobiles, trucks, and the like.

It has become common practice in recent years to secure brake lining segments to brake shoes by means of bonding instead of riveting, in order to achieve the advantage of substantially longer life and to lessen the danger of brake failure. A method for accomplishing such bonding of new lining segments to rebuilt brake shoes, during the mass production of finished brake shoes usable as original or replacement equipment on motor vehicles, is shown and described in my co-pending application Serial No. 419,739, filed March 30, 1954, now abandoned. As is there described in detail, the preferred method of bonding a lining segment to a brake shoe is to apply a viscous liquid adhesive to the segment, thereafter resiliently clamp the segment over the shoe, and then heat the shoe, segment and clamp in a furnace for a period of time sufficient to bring assembled elements up to a predetermined temperature at which the adhesive will melt. Thereafter, the assembled elements are allowed to cool, the clamp removed, and the exterior lining surface ground to perfect cylindrical shape.

According to previous methods of adhesive application, the adhesive was applied to the entire surface of the brake lining segment, which resulted in the formation of gaps or voids in the adhesive during performance of the method indicated above. Such voids were highly undesirable since they weakened the bond between lining segment and shoe, and furthermore since they resulted in wasting of adhesive.

In view of the above factors characteristic of the bonding of brake lining segments to brake shoes, it is an object of the present invention to provide an apparatus for applying adhesive to brake lining segments in multiple strip form and by a highly effective extrusion and wiping action, the result being that no gaps or voids are formed and better material penetration of the lining is obtained so that the strength of the bond is greatly increased.

Another object of the invention is to provide a method and apparatus for wiping viscous liquid adhesive onto brake lining segments in strips and in such a manner that the applied strips have a generally semi-circular section.

Another object of the invention is to provide an apparatus for applying adhesive to brake lining segments while the segments are in their natural arcuate shape.

An additional object is to provide an adhesive application apparatus such that the brake lining segments pass beneath the adhesive extrusion nozzles successively and in end abutment so that the operation is continuous, regardless of whether the operator has caused the segments to be in end abutment when they are fed into the apparatus.

These and other objects and advantages of the invention will be more fully set forth in the following specification and claims considered in connection with the drawings to which they relate.

In the drawings:

Figure 1 is a front elevational view illustrating the apparatus for applying adhesive to brake lining segments;

Figure 2:
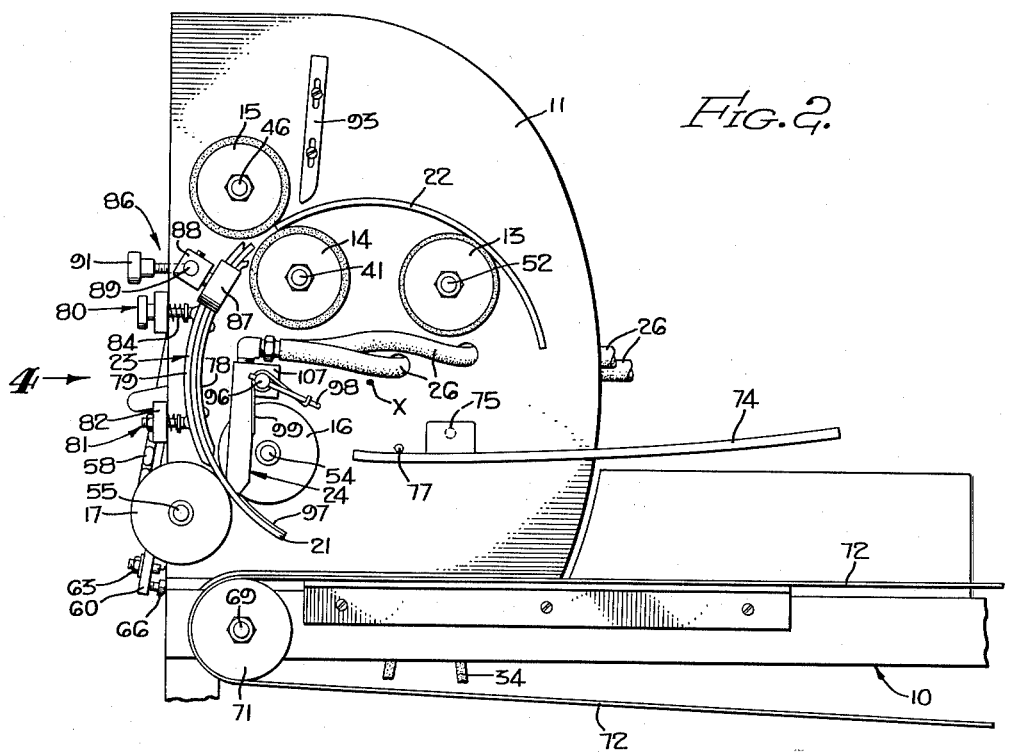
Figure 2 is an enlarged elevational view of the feed roll and nozzle portions of the apparatus shown in Figure 1, there being one brake lining segment shown as passing beneath the adhesive application nozzles and another shown as entering the machine.
Figure 3:
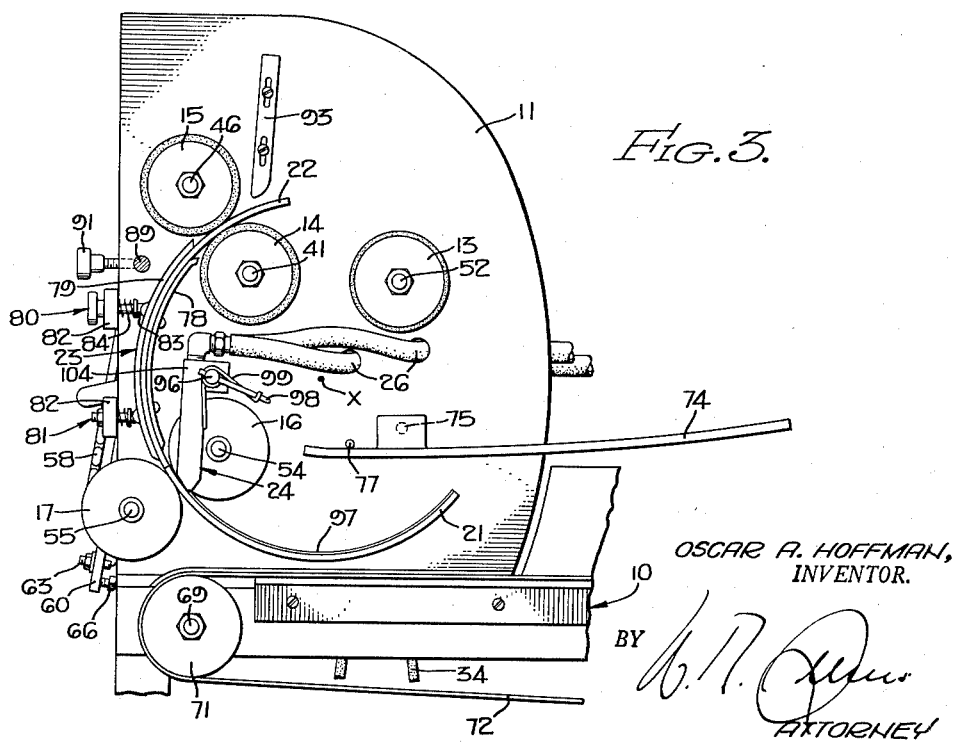

Figure 3 corresponds to Figure 2 but shows the same two brake lining segments after their relative positions have been changed from spaced relation to endwise abutment relation;

Figure 4 is an end elevation of the machine, as viewed from station 4 indicated in Figure 2;

Figure 5 is a vertical sectional view taken along line 5—5 of Figure 4;

Figure 6 is a detail vertical sectional view illustrating a nozzle as disposed to apply adhesive to a brake lining segment;

Figure 7 is a horizontal section on line 7—7 of Figure 6; and

Figure 8 is a detail sectional view taken generally on line 8—8 of Figure 6.

Referring to the drawings, and particularly to Figure 1, the apparatus is seen to comprise generally a supporting table 10 on one end of which is mounted a pair of vertically disposed spaced parallel face plates 11 and 12. Mounted outwardly adjacent the forward face plate 11 of plates 11 and 12 are power driven feed rolls 13—17 which serve to pass arcuate brake lining segments 21 and 22 (Figures 2 and 3) through a guide skid mechanism 23 and beneath a pair of wiper nozzles 24 and 25. Nozzles 24 and 25 are associated with hoses 26 leading to a pressure tank 27 which is supported on table 10 and is adapted to contain an adhesive in the form of a relatively thick and viscous liquid, there being an air hose 28 connected to a suitable source of air pressure, not shown, and adapted to pressurize tank 27 for feeding of the adhesive to the nozzles.

Proceeding first to a description of the feed rolls 13—17 and of the drive means therefor, and with particular reference to Figures 2 and 3, it is pointed out that the feed rolls are all disposed along radiuses of a circle having a center indicated at point X. Rolls 14 and 15, and 16 and 17, are disposed in pairs and with their centers along the same radiuses, respectively, the relationship being such that the brake lining segments may pass between and be driven by the pairs the rolls of which rotate in directions adapted to feed the segments downwardly. The outermost portions of rolls 13, 14 and 16 are disposed a distance from point X which is the same as the radius of the interior surface of lining segment 21 or 22, which means that the segments may be supported on the rolls and passed therethrough without being deformed from their desired arcuate shapes. Thus, the segments 21 and 22 may be regarded as arcs of a circle having a center at X, and the feed roll action is such as to revolve the arcs about their center. Preferably, the drive rolls 13, 14, and 15 are provided with peripheral portions formed of rubber or the like, while the rolls 16 and 17 are formed entirely of metal as illustrated.

The driving force for the feed rolls 13—17 and for other portions of the apparatus comprises a suitable electric motor 30 (Figure 1) connected to a variable speed transmission 31, the arrangement being such that the speed of the output pulley 32 of transmission 31 may be varied by moving a connecting linkage 33 which extends to a convenient location at the upper portion of table 10. Pulley 32 is connected through a belt 34 to a gear box 36 (Figure 5) having an output sprocket 37, the latter being connected through a chain 38 to sprocket 39 on the shaft 41 for drive roll 14. Shaft 41 is suitably journaled in face plates 11 and 12, as are all the other shafts of the apparatus except where otherwise noted, and has mounted thereon, in addition to the sprocket 39 and drive roll 14, a driving gear 42 and a driving sprocket 43. Driving gear 42 meshes with a corresponding gear 44 on a shaft 46 for drive roll 15, the shaft 46 also being provided with sprockets 47 and 48. It is to be understood that rotation of shaft 41 by means of sprockets 37 and 39 and chain 38 effects, through gears 42 and 44, rotation of shaft 46 on which are mounted the sprockets 47 and 48.

Sprocket 43 on shaft 41 is associated with a chain 50 and thus with a sprocket 51 on the shaft 52 for drive roll 13, and with a sprocket 53 on the shaft 54 for drive roll 16. Rolls 13, 14 and 16 are thus rotated in the same direction and counterclockwise as viewed in Figures 2 and 3. Drive roll 15, however, rotates clockwise as viewed in Figures 2 and 3 due to the relationship between gears 42 and 44. Similarly, drive roll 17 is rotated clockwise since its shaft 55 is associated with shaft 46 by means of a sprocket 57 which is connected to sprocket 48 by means of a chain 58.

It is to be noted that the shaft 55 for sprocket 57 and drive roll 17 is not journaled in face plates 11 and 12, but instead is journaled in a bearing 59 on a generally vertical plate 60 which is disposed transversely between face plates 11 and 12. At its upper end, plate 60 is associated with a second bearing 62 supported on the rotating shaft 46. A suitable latch 63 is provided at the lower portion of plate 60 to hold the same resiliently against the end of supporting table 10, there being an adjustable stop 66 provided to regulate the pivoted position of plate 60, shaft 55 and drive roll 17. With the described arrangement the spacing between drive roll 17 and drive roll 16 may be varied to provide increased or decreased driving action by these elements. In addition, the latch 63 may be disengaged to permit pivoting of plate 60 about shaft 46 to an upper position at which the various internal components of the apparatus may be easily reached for maintenance purposes.

Sprocket 47 on shaft 46 is meshed with a chain 67 associated with a sprocket 68 on a shaft 69 which is suitably journaled in supporting table 10 as best shown in Figure 5. At the end of shaft 69 remote from sprocket 68 is mounted a pulley 71 which drives a conveyor belt 72 illustrated in Figure 1, the belt 72 extending horizontally for the full length of table 10 and being connected at its end remote from pulley 71 to an adjustable pulley 73. Pulley 71 rotates clockwise as viewed in Figure 1, so that the upper portion of belt 72 moves away from face plates 11 and 12 for the purpose of conducting lining segments away from the nozzles 24 and 25 after application of adhesive. A horizontal guide plate 74 is mounted above belt 72 adjacent the nozzles and serves the function of preventing the lining segments from becoming improperly disposed on the conveyor belt. Plate 74 is pivotally supported at 75 by face plate 11, there being a pin 77 provided above plate 74 to hold it in its horizontal position except when it is pivoted counterclockwise about support 75.

Referring again to Figures 2 and 3, the guide skid mechanism 23 is shown as mounted between feed rolls 14 and 15, at the upper portion of face plate 11, and rolls 16 and 17 at the lower portion thereof. Mechanism 23 comprises an inner arcuate guide or clamping plate 78 mounted rigidly on face plate 11, and on outer arcuate guide clamping plate 79 supported by upper and lower spring bias mechanisms 80 and 81. Each mechanism 80 and 81 comprises a lug 82 on face plate 11, a rod 83 freely slidable within the lug 82 and connected to outer plate 79, and a helical compression spring 84 seated between lug 82 and rod 83 and adapted to urge plate 79 in the direction of plate 78 or to the right as viewed in Figures 2 and 3. The adjacent surfaces of plates 78 and 79 are disposed generally along the circumference of the circle having its center at X, as previously indicated, and a radius approximately equal to the radiuses of the lining segments 21 and 22. The plates 78 and 79 are adapted to receive between them the lining segments as they leave the feed rolls 14 and 15, the relationship being such that the lining segments are frictionally retained in position between the plates 78 and 79 as they are fed downwardly by operation of the power driven rolls.

In order to maintain the segments 21 and 22 perfectly vertical as they pass downwardly between plates 78 and 79, a side roller mechanism 86 is provided and comprises a roller 87 freely journaled in a block 88 which is mounted on a pin 89 extending slidably through the forward face plate 11 as shown in Figure 4. A set screw 91 is inserted in the edge of plate 11 and adapted to bear against a flat 92 on pin 89, so that the pin is prevented from rotating but is permitted axial movement when the set screw 91 is loosened. It follows that by loosening set screw 91 the lateral position of roller 87 may be adjusted so that it will bear against the outer edges of lining segments 21 and 22 of various widths, it being understood that the inner edges of the lining segments bear against face plate 11.

In the operation of the lining segment feeding portion of the apparatus, a segment 21 or 22 is disposed with its interior or lower surface on feed roller 13 as shown in Figure 2, and its end if manually inserted beneath an adjustable guide bar 93 on face plate 11 and into the space between cooperating feed rolls 14 and 15. The three rolls 13-15 then cooperate to feed the lining segment into guide skid mechanism 23, with the side roller mechanism 86 serving to prevent the segment from shifting laterally. The spacing of rolls 14 and 15 from rolls 16 and 17 is such that the lower end of a lining segment is gripped by the rolls 16 and 17 before the upper end thereof leaves rolls 14 and 15. It follows that the feeding of the segments is continuous, and that the movement of the segments beneath the nozzles 24 and 25 will be at a uniform rate. After the lower rolls 16 and 17 have drawn the lining segment completely through the guide skid mechanism 23, the segment falls free on the conveyor belt 72 which serves to convey it to a suitable discharge point.

It is highly desirable that the segments 21 and 22, which are merely illustrative of the large numbers of segments passed sequentially through the apparatus during the mass production of brake shoes with bonded linings, be in endwise abutment as they pass beneath the nozzles 24 and 25 in order that there will be no discontinuity and no necessity for interrupting the flow of adhesive through the nozzles. On the other hand, it has proved extremely difficult for an operator to feed the segments into the machine in such a way that endwise abutment will be insured. Accordingly, the previously described drive portions of the present invention are constructed in such a way that the feed rolls 14 and 15 operate to move the segments 21 and 22 at a more rapid rate than do the feed rolls 16 and 17, so that the lining segment last inserted in the apparatus will travel at a higher rate than a segment emerging therefrom. As shown in Figure 2, the emerging segment 21 is spaced a substantial distance from the segment 22 being inserted into the gap between rolls 14 and 15. However, as shown in Figure 3, by the time the lower end of segment 22 has moved to a point adjacent nozzles 24 and 25 the segments are in endwise abutment due to the more rapid feeding action of rolls 14 and 15.

Proceeding next to a detailed description of the nozzles 24 and 25 and related apparatus, and referring particularly to Figures 6-8, these very important elements are shown as mounted on a cross shaft 96 and on opposite sides of the feed roll 16, the latter engaging the lining segments at approximately their centers as illustrated in Figure 8. The forward nozzle 24 is adapted to deposit three or more parallel strips or bands 97 of adhesive on one side of each lining segment, while the rear nozzle 25 deposits three or more parallel strips or bands 97 on the other side of the segment. It has been discovered that when the bands 97 are properly deposited in accurately spaced parallel relationship and with a predetermined cross sectional shape and size, the adhesive will flow during a subsequent heating step to cover entirely the opposite edge portions of the lining segment, leaving only a small gap at its center. This is to be contrasted with the relatively wasteful prior art methods by which adhesive is applied to substantially the entire segment surface resulting, as previously stated, in gaps and voids in the adhesive between the lining and the shoe.

In order to effect accurate deposition and adherence of bands 97 having a semi-circular cross sectional shape, as distinguished from complete circles or other configurations which are relatively difficult to control and which due to the rapid hardening characteristics of the adhesive may not remain in the exact desired locations on the brake lining segments, the invention provides for the combined extruding and wiping of the adhesive onto the segments as distinguished from extruding or deposition alone. By "wiping" it is intended to mean that the nozzles 24 and 25 not only serve to extrude the adhesive but also actually engage the interior lining segment surfaces, preferably in such a manner as to control the cross sectional shape and exact location of the strips 97.

A preferred mounting arrangement by which the ends of nozzles 24 and 25 are maintained in wiping contact with the interior lining segment surfaces comprises mounting the nozzles 24 and 25 on shaft 96 for pivotal movement thereabout, and providing resilient means to inter-relate the shaft position with the nozzle positions. More specifically, and as best shown in Figure 7, a generally U-shaped crank 98 is mounted in shaft 96, which is journaled in plates 11 and 12 as shown in Figure 4, and springs 99 are mounted around shaft 96 in such way as to rotate the nozzles away from crank 98 or into engagement with the lining segments. In order to adjust the pressure contact thus effected between the nozzles and segments, a flexible adjustment plate 101 (Figure 5) is provided and is adapted to maintain shaft 96 in one of a number of predetermined rotated positions. Plate 101 is formed with a number of holes 102 adapted selectively to fit over a pin 103 (Figure 4) on face plate 12. It follows that upon flexing of plate 101 so that pin 103 no longer is inserted in one of the holes 102 the plate and shaft 96 may be rotated manually to another predetermined position, at which the plate is permitted to again fit over pin 103. The spring bias between crank 98 and nozzles 24 and 25 is thus altered to vary the amount of pressure between the nozzles and lining segments.

Each nozzle 24 and 25 comprises an elongated body portion 104 of rectangular section and formed with a center chamber 106 in communication at its upper end with an adhesive feeding hose 26. A lug 107 is formed integral with portion 104, relatively adjacent the connection for hose 26, and is adapted to receive the shaft 96. Communicating with the lower end of chamber 106, and spaced from each other transversely of the lining segments, are three passages or orifices 108 which terminate at the extreme lower end of the nozzle. It is a feature of the invention that the extreme lower end of each nozzle, the portion where the passages 108 terminate, is disposed partially in a plane which is generally perpendicular to the longitudinal nozzle axis, and partially in a plane which is oblique to the longitudinal nozzle axis and generally parallel to the interior surface of the brake lining segment. More specifically, one surface 109 of the nozzle end is disposed in general flatwise engagement with the interior lining segment surface and terminates at an edge 110 transverse to the longitudinal lining segment axis and substantially centrally of the passages 108. Another surface 111 of the nozzle end extends from the edge 110 and in a direction oblique to the interior lining segment surface, but generally perpendicular to the longitudinal axis of the nozzle, and at least for the remainders of the passages 108. With the described construction the portions of passages 108 which terminate in the plane of surface 109 are blocked by the interior lining segment surface, so that a wiping action takes place at these points, while the portions of the passages 108 terminating in the plane of surface 111 are free to extrude streams of adhesive onto the interior segment surface. It follows that the strips or bands 97 of adhesive will be semi-circular in section, although the passages 108 themselves are preferably circular in section, and that the adhesive is applied in a true wiping action.

The method of the invention may be performed either with the above described apparatus or with similar apparatus, and in some instances by hand. The method may be stated to comprise, generally, applying adhesive in liquid form and in parallel strips or bands to the interior surfaces of brake lining segments and in such a way that the adhesive is both extruded and wiped onto the segments, as distinguished from being merely extruded thereon. The adhesive is relatively viscous, and its application by wiping results in strips which are of uniform cross sectional shape and are uniformly spaced, so that during the subsequent heating step a predetermined spreading of the adhesive takes place, and a relatively continuous layer of adhesive is formed between the lining segments and the brake shoes with which they are associated.

With the above described apparatus the adhesive is applied by extrusion and wiping and to segments 21 and 22 which are fed longitudinally along the circumference of a circle having the same radius as the natural radiuses of the arcuate segments themselves. The details of this feeding operation have been described heretofore, and result in a continuous feeding of segments in endwise abutment past the lower ends of nozzles 24 and 25, the latter being resiliently pressed against the interior segment surfaces by the spring means 99. Adhesive is fed from pressure tank 27 and through hoses 26 to nozzles 24 and 25, being ejected through only half of the cross sections of nozzle passages 108 as described in detail above.

The invention contemplates the use of a relatively viscous quick setting adhesive, preferably comprising a rubber-base phenyl resin. More specifically, the adhesive may comprise a compound manufactured by the Goodrich Rubber Company under the trademark "Plastiloc No. 605," or a compound manufactured by the Chrysler Corporation under the trademark "Cycleweld."

While the particular method and apparatus herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. A machine for applying viscous liquid adhesive to arcuate brake lining segments, which comprises inlet and outlet pairs of power driven feed rolls, said pairs of feed rolls being spaced from each other a distance less than the length of each of said segments and being adapted to pass said segments sequentially and longitudinally along an arc having the same curvature as that of said segments, guide skid means disposed between said pairs of feed rolls and adapted to frictionally receive said segments, and nozzle means disposed on the opposite side of said outlet pair of feed rolls from said guide skid means, said nozzle means being in wiping engagement with the interior surface of the segment passing adjacent thereto and being adapted to deposit said viscous liquid on said interior surface.

2. The invention as claimed in claim 1, in which adjustable spring bias means are provided to press said nozzle means into engagement with said interior surface.

3. The invention as claimed in claim 1, in which said inlet pair of feed rolls is driven at a faster rate than said outlet pair, the drive rate relationship being such that segments sequentially fed into said inlet pair in spaced relationship are in endwise engagement when passing adjacent said nozzle means.

References Cited in the file of this patent

UNITED STATES PATENTS

| | | |
|---|---|---|
| 1,117,341 | Cross | Nov. 17, 1914 |
| 2,014,472 | French | Sept. 17, 1935 |
| 2,042,479 | Newhall | June 2, 1936 |
| 2,294,472 | MacKenzie | Sept. 1, 1942 |
| 2,663,886 | Jester | Dec. 29, 1953 |